United States Patent Office 3,546,256
Patented Dec. 8, 1970

3,546,256
PROCESS FOR SEPARATING ORGANIC MIXTURES CONTAINING NF₂ GROUPS
Abraham A. Zimmerman, New York, N.Y., assignor to Esso Research and Engineering Company, a corporation of Delaware
No Drawing. Filed Feb. 1, 1962, Ser. No. 170,862
Int. Cl. C07d 5/16
U.S. Cl. 260—347.4                   6 Claims This invention relates to a process for separation of high-energy compounds containing varying amounts of $NF_2$ groups and isomeric $NF_2$ containing compounds treated in liquid phase by a chromatographic method.

The present invention provides a successful method for separation that uses suitable porous, solid, siliceous adsorbents, such as activated silica gel and activated magnesium silicate such as Florisil, in an adsorption column through which a liquid mixture of components to be separated is diffused or percolated, whereby certain $NF_2$-containing components of the liquid mixture become concentrated by preferential or selective adsorption, after which the thus concentrated components are desorbed or eluted by proper solvents and recovered.

This kind of separation makes use of the different affinities of the $NF_2$-containing compounds and of solvents for adsorption by the adsorbents at ordinary or moderate temperatures and pressures, the solvents being of a kind that can be easily separated from the $NF_2$-containing compounds by vaporization. With the use of suitable adsorbents and solvents, the $NF_2$-containing compounds can be separated and recovered with little or no degradation. This kind of separation is particularly useful for achieving better separations of $NF_2$-containing compounds difficult to separate by common purification techniques such as fractional distillation.

In a preferred method of separation by adsorption and desorption, the mixed $NF_2$-containing organic compounds ($CNF_2$ compounds) to be separated are dissolved in a feed solvent or diluent of lower adsorbtivity to aid diffusion without unduly lowering the capacity of the adsorbent to adsorb the $CNF_2$ compounds. This feed solvent, typified by carbon tetrachloride (boiling point, +76.8° C.), is less polar than the $NF_2$-containing organic compounds and less polar than the desorbing solvent.

In using a fixed adsorbent bed process, the liquid feed mixture of the $CNF_2$ compounds to be concentrated or separated is charged to the top of the bed of adsorbent particles which rests on sand and/or glass wool as a means for supporting the bed and preventing the absorbent particles from being in the liquid effluent that leaves the bottom of the bed and passes through such supporting means. As the liquid feed mixture percolates down through the adsorbent bed, the $NF_2$ compounds are adsorbed more or less strongly depending on their structural differences.

The liquids to be separated and the desorbing liquid may be passed into a column for upflow movement. The different liquid $CNF_2$ compounds pass through the column of adsorbent at different rates and concentrate in separate parts of the column. Thus, when displaced, they emerge to be separately collected.

The desorbing liquid used to displace and wash out the adsorbed concentrates or adsorbate fractions should contain a liquid desorbing agent, such as chloroform (boiling point, +61.2° C.), which is adsorbed sufficiently to displace the $NF_2$ compounds. The desorbing liquid agent can be used more effectively when diluted with the kind of liquid used as feed diluent, for which the adsorbent has slightly less affinity.

Various organic liquids can be selected to be used as diluents for the feed, as diluents for the desorbing agent, and as the desorbing agents with due consideration of the character of the $NF_2$-containing compounds and the specific adsorbent. For example, methylene chloride ($CH_2Cl_2$) may be substituted for chloroform as the desorbing agent, and chloroform may be used as the feed diluent and as the desorbing agent diluent. Other diluents and desorbing agents are a nitro group and halogen (preferably Cl and/or F) substituted $C_1$ to $C_3$ paraffins. Other liquids that qualify are ketones, ethers, and esters. Low boiling hydrocarbons may be used as diluents, e.g. alkanes and benzene. The diluents and desorbing liquids are essentially inert and stable throughout the process. They have boiling points generally in the range of 30° to 80° C. under 1 atm. pressure.

The porous, solid adsorbents found suitable for the separation of the $NF_2$-containing compounds are silica gel and Florisil, these adsorbents having surface areas in the range of about 500 to 1400 sq. meters/g. Alumina-containing adsorbents are unsatisfactory because they have been shown to cause extensive degradation of $CNF_2$ compounds. Used in a fixed bed or column, the adsorbents have a particle size of about 20 or 100 to 200 mesh.

After the concentration of the feed components of different adsorptivity in one or more strata of the bed, these concentrates are displaced in consecutive order by elution with suitable desorbent liquids and each concentrate is collected as a separate fraction. The desorbing agent and diluent liquids can then be removed from each concentrate by distillation under vacuum, or by vaporization with dry inert gas, e.g. $N_2$.

The temperatures and pressures in the adsorbent bed or column are conveniently and preferably ambient temperatures and pressures, e.g. in the range of 20° to 30° C. and about 1 atm. The conditions may be controlled and adjusted for variations. A pressure slightly above 1 atm. is employed with the upflow method.

Separations for which the present method has been demonstrated to be useful are separations of the nature of bis-($NF_2$) adducts of butadiene and tetrakis-($NF_2$) adducts of butadiene and such adducts of other organic compounds having two to three carbon-to-carbon double bonds, e.g. alkenes, dienes, trienes, cyclic compounds, e.g. furan, cyclohexadiene, benzene, and $NF_2$-containing compounds having negative polar groups, e.g., isocyanate, alkoxy, acetoxy, hydroxyl and nitrile. Most of these compounds contain a total of two to eight carbon atoms per molecule.

Usually, this method of separation is advantageously used for accomplishing a separation between components having the same number of carbon atoms and similar structure except for the difference in the number of $NF_2$ groups and double bonds between carbon atoms. The $NF_2$-adducts of the unsaturated organic compounds are the derivatives in which $NF_2$ groups are linked to carbon atoms in the molecule to saturate one or more double bonds. Thus, the bis-($NF_2$) adduct of butadiene may be termed bis-($NF_2$) butene, $CH_2(NF_2)CH(NF_2)CH:CH_2$, and the tetrakis-($NF_2$) adduct of butadiene may be termed tetrakis-($NF_2$) butane, which has the formula $$CH_2(NF_2)CH(NF_2)CH(NF_2)CH_2(NF_2)$$

Such $CNF_2$ compounds may also contain the $NF_2$ groups linked to a carbon atoms by substitution for hydrogen or a functional group.

The following examples show that the method of this invention is very effective.

EXAMPLE 1

A 462 mg. mixture of 60 wt. percent bis-($NF_2$) acetoxy butadiene adduct and 40 wt. percent tetrakis-($NF_2$) acetoxy butadiene adduct was dissolved in 2 ml. of $CCl_4$ and placed on top of a column containing 18 g. of activated silica gel (100 to 200 mesh) particles in a column about 1 ft. in height. The saturation point can be detected by noting when some liquid starts to drain from the bed after allowing a period for diffusion or equilibrium to be reached. A suitable amount of dissolving liquid (10% $CHCl_3$ and 90% $CCl_4$) was added to the top of the column and 25 ml. portions of eluent were collected. The collected eluent was freed of $CCl_4$ and $CHCl_3$. By progressively increasing the concentration of $CHCl_3$ in the eluent, three cuts were collected. Infrared spectra were used as a criterion for distinguishing cuts. The first cut (157 mg.) was shown by analysis to be the tetrakis adduct (185 mg. in the initial feed). The second cut contained a mixture of the tetrakis with bis-($NF_2$) adducts. The third cut was a concentrate of the bis adducts.

EXAMPLE 2

In a similar manner to that described in Example 1, mixtures of bis-($NF_2$) and tetrakis-($NF_2$) adducts of furfuryl acetate were separated, with 98% recovery of the total input.

EXAMPLE 3

Bis-($NF_2$) and tetrakis-($NF_2$) adducts of hexatriene were satisfactorily separated by this same technique.

The fixed bed procedure can be made cyclical, using the method described and using $CCl_4$ to wash out the $CHCl_3$ from the bed preparatory to charging another feed charge of the $NF_2$-containing compounds to be separated.

Various modifications can be made in ways known to those skilled in the art of chromatography, for example, the use of columns in series, countercurrent flow of liquids, use of moving beds for continuous operation, stripping and enriching of bed sections, and refluxing.

What is claimed is:
1. Process for separating mixtures of organic compounds containing $NF_2$ groups according to their structures and $NF_2$ content by a chromatographic method which comprises, concentrating at least one fraction of said mixture by adsorption on siliceous adsorbent particles, and desorbing said adsorbed fraction by a lower boiling desorbing liquid of approximately similar affinity for the adsorbent, then recovering the concentrated $NF_2$-containing fraction.

2. Process for separating a tetrakis-($NF_2$) adduct of an unsaturated organic compound from lower $NF_2$ content adducts of said organic compound using chromatography which comprises, diffusing a mixture of said adducts into contact with a siliceous adsorbent which selectively adsorbs a portion of the mixture containing adducts, thereafter desorbing the adducts with a lower boiling desorbing liquid having an affinity for the adsorbent similar to that of $CCl_4$, and recovering the resulting desorbate.

3. Process for separating tetrakis-($NF_2$) adduct of an organic compound having two to three carbon-to-carbon double bonds from a bis-($NF_2$) adduct of the organic compound by chromatography which comprises, diffusing a liquid mixture of said adducts into contact with activated silica gel adsorbent to concentrate the adducts in different portions of the adsorbent, then displacing each adsorbed concentrate from the adsorbent by displacing with liquid chloroform, and recovering thus separated concentrates of the adducts.

4. The process set forth in claim 3, wherein the adducts in the liquid mixture are tetrakis-($NF_2$) and bis-($NF_2$) adducts of acetoxy butadiene.

5. The process set forth in claim 3, wherein the adducts in the liquid mixture are tetrakis-($NF_2$) and bis-($NF_2$) adducts of furfuryl acetate.

6. The process set forth in claim 3, wherein the liquid mixture of adducts is diluted with carbon tetrachloride and the chloroform is diluted with carbon tetrachloride.

References Cited

UNITED STATES PATENTS 2,585,492   2/1952   Olsen _____ 210—31X
2,723,756   11/1955  Miller et al. _____ 210—31

LELAND A. SEBASTIAN, Primary Examiner

U.S. Cl. X.R.

149—109; 210—31; 260—347.7, 453, 464, 563, 583, 584, 593, 708